US010472110B2

(12) United States Patent
Chen et al.

(10) Patent No.: US 10,472,110 B2
(45) Date of Patent: Nov. 12, 2019

(54) METHODS FOR PACKAGING AND STERILIZING ELASTOMERIC ARTICLES AND PACKAGED ELASTOMERIC ARTICLES PRODUCED THEREBY

(71) Applicant: Allegiance Corporation, Waukegan, IL (US)

(72) Inventors: Seong Fong Chen, Penang (MY); Wei Cheong Wong, Kedah (MY)

(73) Assignee: ALLEGIANCE CORPORATION, McGaw Park, IL (US)

( * ) Notice: Subject to any disclaimer, the term of this patent is extended or adjusted under 35 U.S.C. 154(b) by 725 days.

(21) Appl. No.: 15/172,686

(22) Filed: Jun. 3, 2016

(65) Prior Publication Data

US 2016/0355288 A1 Dec. 8, 2016

Related U.S. Application Data

(63) Continuation of application No. 13/009,386, filed on Jan. 19, 2011, now Pat. No. 9,382,023.

(60) Provisional application No. 61/297,593, filed on Jan. 22, 2010, provisional application No. 61/331,204, filed on May 4, 2010.

(51) Int. Cl.
*B65B 55/16* (2006.01)
*B32B 7/06* (2019.01)
*B32B 25/08* (2006.01)
*B32B 27/08* (2006.01)
*B32B 27/32* (2006.01)
*B65B 7/16* (2006.01)
*B65B 9/04* (2006.01)
*B65B 31/02* (2006.01)
*B65B 63/02* (2006.01)
*B65D 81/20* (2006.01)
*B65B 5/04* (2006.01)
*B65B 51/10* (2006.01)
*B65D 65/38* (2006.01)

(52) U.S. Cl.
CPC ............. *B65B 55/16* (2013.01); *B32B 7/06* (2013.01); *B32B 25/08* (2013.01); *B32B 27/08* (2013.01); *B32B 27/32* (2013.01); *B65B 5/04* (2013.01); *B65B 7/164* (2013.01); *B65B 9/045* (2013.01); *B65B 31/02* (2013.01); *B65B 51/10* (2013.01); *B65B 63/02* (2013.01); *B65D 65/38* (2013.01); *B65D 81/2007* (2013.01)

(58) Field of Classification Search
CPC .......... B65B 31/00; B65B 31/04; B65B 55/16
USPC .... 206/438, 439, 484, 484.1, 524.8; 53/400, 53/403, 405, 408, 425, 432
See application file for complete search history.

(56) References Cited

U.S. PATENT DOCUMENTS

| 2,732,934 | A | 1/1956 | Hall |
| 3,372,799 | A | 3/1968 | Abildgaard |
| 3,384,225 | A | 5/1968 | Nye |
| 3,630,665 | A | 12/1971 | Andersen |
| 3,670,874 | A | 6/1972 | Brunner |
| 3,815,315 | A | 6/1974 | Glick |
| 3,870,150 | A | 3/1975 | Hummel |
| 3,892,314 | A | 7/1975 | Semp |
| 4,155,494 | A | 5/1979 | Poncy et al. |
| 4,617,230 | A | 10/1986 | Shah et al. |
| 4,804,432 | A | 2/1989 | Jurrius et al. |
| 5,014,494 | A | 5/1991 | George |
| 5,065,863 | A | 11/1991 | Moyet-Ortiz |
| 5,105,001 | A | 4/1992 | Goins et al. |
| 5,228,271 | A | 7/1993 | Wallace |
| 5,392,590 | A | 2/1995 | Ambrose et al. |
| 5,414,049 | A | 5/1995 | Sun et al. |
| 5,577,368 | A | 11/1996 | Hamilton et al. |
| 5,873,217 | A | 2/1999 | Smith |
| 5,881,534 | A | 3/1999 | Ahlqvist et al. |
| 5,885,524 | A | 3/1999 | Watanabe et al. |
| 5,911,321 | A | 6/1999 | Brinkmann |
| 6,060,136 | A | 5/2000 | Patrick et al. |
| 6,134,863 | A | 10/2000 | Knox |
| 6,195,805 | B1 | 3/2001 | Bourne et al. |

(Continued)

FOREIGN PATENT DOCUMENTS

| CN | 101602877 A | 12/2009 |
| CN | 101602877 B | 5/2011 |

(Continued)

OTHER PUBLICATIONS

Alam., et al., "17O NMR Investigation of Oxidative Degradation in Polymers under Gamma-irradiation," Radiation Physics and Chemistry, 2001, vol. 60 (1-2). 27 pages.
ASTM International. "Standard Test Method for Detection of Holes in Medical Gloves." ASTM Standard D5151-06, Published Jan. 2007, 2 pages.
Bauman, R.G., "The Mechanism of Radiation Damage to Elastomers. II. Crosslinking and Antirad Action", Journal of Applied Polymer Science, 1959, vol. 2 (6), pp. 328-332.

(Continued)

*Primary Examiner* — Gloria R Weeks
(74) *Attorney, Agent, or Firm* — Cardinal Health, Inc.

(57) ABSTRACT

The present invention relates generally to methods of sterilizing elastomeric articles in a manner that prevents and/or reduces degradation to the articles, particularly degradation that may be caused and/or accelerated by sterilization techniques such as gamma irradiation, x-ray irradiation, and electron-beam processing. The methods include packaging the elastomeric articles in order to improve their resistance to degradation. In certain aspects of the invention, packaged elastomeric articles, optionally containing one or more antidegradants, such as antioxidant and/or antiozonant compounds, are also provided. The methods of providing degradation-resistant elastomeric articles in accordance with the present invention may also be used to reduce the occurrence of cracking and discoloration in elastomeric articles, regardless of whether they are subjected to sterilization.

18 Claims, No Drawings

(56) References Cited

U.S. PATENT DOCUMENTS

| | | |
|---|---|---|
| 6,256,968 B1 | 7/2001 | Kristen |
| 6,306,514 B1 | 10/2001 | Weikel et al. |
| 6,347,408 B1 | 2/2002 | Yeh |
| 6,425,136 B1 | 7/2002 | Schlamp et al. |
| 6,524,978 B1 | 2/2003 | Moore |
| 6,582,788 B2 | 6/2003 | Yeh |
| 6,618,861 B2 | 9/2003 | Saks et al. |
| 6,664,308 B2 | 12/2003 | Sun et al. |
| 6,699,934 B2 | 3/2004 | Chikanari et al. |
| 6,828,387 B2 | 12/2004 | Wang et al. |
| 6,864,312 B2 | 3/2005 | Moore |
| 6,887,542 B2 | 5/2005 | Conley et al. |
| 7,179,415 B2 | 2/2007 | Teoh et al. |
| 7,231,751 B2 | 6/2007 | Snell et al. |
| 7,243,477 B2 | 7/2007 | Snell et al. |
| 7,364,694 B2 | 4/2008 | Tornier |
| 7,566,502 B1 | 7/2009 | Chen et al. |
| 7,758,806 B2 | 7/2010 | Zhao |
| 7,779,610 B2 | 8/2010 | Snell |
| 7,938,580 B2 | 5/2011 | Gaskell et al. |
| 8,032,229 B2 | 10/2011 | Gerber et al. |
| 8,062,755 B2 | 11/2011 | Chen et al. |
| 8,110,266 B2 | 2/2012 | Chen et al. |
| 8,479,918 B2 | 7/2013 | Howard |
| 8,835,014 B2 | 9/2014 | Wang et al. |
| 2004/0071909 A1 | 4/2004 | McGlothlin et al. |
| 2004/0091504 A1 | 5/2004 | Hamann |
| 2004/0091557 A1 | 5/2004 | Hamann |
| 2004/0126604 A1 | 7/2004 | Wang et al. |
| 2005/0006264 A1 | 1/2005 | Low |
| 2005/0031817 A1 | 2/2005 | Littleton et al. |
| 2005/0268573 A1 | 12/2005 | Yan |
| 2006/0016155 A1 | 1/2006 | Oesterlein |
| 2006/0144878 A1 | 7/2006 | Williams et al. |
| 2007/0084144 A1 | 4/2007 | Labrecque et al. |
| 2007/0108075 A1 | 5/2007 | Withers |
| 2007/0212792 A1 | 9/2007 | Havens et al. |
| 2008/0020023 A1 | 1/2008 | Wang et al. |
| 2009/0118435 A1 | 5/2009 | Van Jole et al. |
| 2009/0166237 A1 | 7/2009 | Gaskell et al. |
| 2009/0255033 A1 | 10/2009 | Chen et al. |
| 2009/0288366 A1 | 11/2009 | Schorr et al. |
| 2009/0313954 A1 | 12/2009 | Aarts et al. |
| 2010/0263695 A1 | 10/2010 | Hampe |
| 2010/0293892 A1 | 11/2010 | Curry et al. |
| 2011/0108587 A1 | 5/2011 | Williams |

FOREIGN PATENT DOCUMENTS

| | | |
|---|---|---|
| EP | 0218003 B1 | 11/1990 |
| JP | S63138972 A | 6/1988 |
| JP | H0716286 A | 1/1995 |
| JP | 2006168682 A | 6/2006 |
| KR | 1020010020302 A | 3/2001 |
| MX | 2010011650 A | 11/2010 |
| WO | WO-03072340 A1 | 9/2003 |
| WO | 2005054077 A1 | 6/2005 |
| WO | WO-2007017368 A1 | 2/2007 |
| WO | WO-2007017375 A1 | 2/2007 |

OTHER PUBLICATIONS

Chakraborty., et al. "Safer Accelerators for the Latex Industry." Presentation at 2nd International Rubber Glove Conference 2004, Kuala Lumpur, Malaysia. pp. 1-12.

Chen F. B. "Synthetic Polyisoprene Latex," 3rd International Rubber Glove Conference & Exhibition. Sep. 12-14, 2006, Kuala Lumpur, Malaysia. pp. 1-19.

Decision of Rejection for Japanese Patent Application No. 2012550060, dated Oct. 6, 2015, 7 pages.

Editorial Board of the Society of Rubber Science and Technology, Japan, "Introductory Course: Easy Rubber Chemistry, Lecture 7, Understanding and Preventing Degradation of Rubber (vol. 1)", Journal of the Society of Rubber Science and Technology, Japan, 2004, V. 77-3, pp. 109-115.

European Office Action mailed in European Patent Application No. 11735046.2, dated Apr. 9, 2015, 4 pages.

European Office Action mailed in European Patent Application No. 11735046.2, dated Jun. 18, 2014, 4 pages.

Hemmerich, Karl J. "Radiation sterilization-polymer materials selection for radiation-sterilized Products," MDDI Feb. 2000: 78. 11 pages.

Henderson P., "From Isoprene monomer to synthetic polyisoprene latex and its uses," Presentation at Latex 2001, Dec. 4-5, 2001, Munich, Germany. pp. 77-90.

Henderson P., "Isoprene Monomer to Synthetic Polyisoprene Latex," International Latex Conference 2000, Jul. 25-26, 2000, Akron, Ohio, US, 8 pages.

Japanese Office Action mailed in Japanese Patent Application No. 2012550060, dated Sep. 9, 2014, 8 pages.

Kraton. Cariflex Polyisoprene products, 2011, 5 pages.

Michelman, Michem Lube 180, Technical Data Sheet, Revised Aug. 12, 2008, 3 pages.

Office Action in corresponding Chinese Patent Application No. 201180006680.2; dated Aug. 4, 2015. 8 pages.

Ohm., et al., "Review of antiozonants," Rubber World-Akron, Lippincott & Peto, Aug. 1993, vol. 208, pp. 18-22.

Oliver R., et al., "The Sterilization of Surgical Rubber Gloves and Plastic Tubing by Means of Ionizing Radiation," The Journal of Hygiene, 1960, vol. 58, pp. 465-472.

"Ozone cracking" from Wikipedia, the free encyclopedia. Retrieved from the Internet: https://en.wikipedia.org/w/index.php?title=Ozone_cracking&oldid=404780592. Last updated on Dec. 29, 2010, accessed on Apr. 1, 2016. 4 pages.

Rada, Rinaldi I. International Preliminary Report on Patentability for Application No. PCT/US2011/021549, dated Apr. 20, 2012. 12 pages.

Shang, et al., "Radiation Sterilization Compatibility of Medical Packaging Materials," Journal of Vinyl and Additive Technology, Mar. 1998, vol. 4, pp. 60-64.

Supplementary European Search Report and Search Opinion mailed in European Patent Application No. 11735046.2, dated Oct. 30, 2013, 6 pages.

The State Intellectual Property Office of the People's Republic of China, First Office Action dated Dec. 25, 2013, Chinese Patent Application No. 201180006680.2. 16 pages.

The State Intellectual Property Office of the People's Republic of China Second Office Action mailed in Chinese Patent Application No. 201180006680.2, dated Nov. 14, 2014, 13 pages.

Tillotson, "Ozone Can Cause Serious Problems for Natural Rubber Latex Gloves." Tillotson Healthcare Corporation, Technicare Bulletin, Nov. 13, 2006, pp. 1-3.

Webster., et al. "A Novel Accelerator System for Synthetic Polyisoprene." Presentation at International Latex Conference 2004, Jul. 20-21, 2004, Akron, Ohio. 9 pages.

Young, Lee W. International Search Report mailed in International Application No. PCT/US2011/021549, dated Mar. 21, 2011, 2 pages.

Young, Lee W. Written Opinion of the International Searching Authority for International Application No. PCT/US2011/021549, dated Mar. 21, 2011. 8 pages.

Genencor Fact Sheet, "Synthetic Polyisoprene", downloaded on Jan. 26, 2010 from the internet: http://daniscosugar.com/cms/connect/genencor/products_and_services/business_devlopment/biochemicals/in_focus_bioisoprene/bioisoprene_en.htm, 2008, 7 pages.

METHODS FOR PACKAGING AND STERILIZING ELASTOMERIC ARTICLES AND PACKAGED ELASTOMERIC ARTICLES PRODUCED THEREBY

CROSS-REFERENCE TO RELATED APPLICATIONS

This application is a continuation application of U.S. application Ser. No. 13/009,386 filed on Jan. 19, 2011, titled, "METHODS FOR PACKAGING AND STERILIZING ELASTOMERIC ARTICLES, AND PACKAGED ELASTOMERIC ARTICLES PRODUCED THEREBY", granted as U.S. Pat. No. 9,382,023, issued Jul. 5, 2016, which claims priority to U.S. Provisional Patent Application No. 61/297,593 filed on Jan. 22, 2010, titled "METHODS FOR PACKAGING AND STERILIZING ELASTOMERIC ARTICLES, AND PACKAGED ELASTOMERIC ARTICLES PRODUCED THEREBY" and U.S. Provisional Patent Application No. 61/331,204 filed on May 4, 2010, titled "METHODS FOR PACKAGING AND STERILIZING ELASTOMERIC ARTICLES, AND PACKAGED ELASTOMERIC ARTICLES PRODUCED THEREBY".

BACKGROUND OF THE INVENTION

1. Field of the Invention

The present invention relates generally to methods of packaging and sterilizing elastomeric articles in a manner that prevents and/or reduces degradation to the articles, particularly degradation that may be caused and/or accelerated by sterilization techniques such as gamma irradiation, x-ray irradiation, and electron-beam processing. In certain aspects of the invention, packaged elastomeric articles containing one or more antidegradants, such as antioxidant and/or antiozonant compounds, are also provided. The methods of providing degradation-resistant elastomeric articles in accordance with the present invention may also be used to reduce the occurrence of cracking and discoloration in elastomeric articles, regardless of whether they are subjected to sterilization.

2. Description of Related Art

Although the technology involved in the production of synthetic polyisoprene (PI) latex has been used for a long period of time, synthetic PI latex has only been used commercially for glove manufacturing for about the last decade. This was in part because the price of synthetic PI latex is significantly higher than natural rubber latex, although both latices have polyisoprene as their active ingredients.

However, in view of the increased level of awareness regarding allergies to proteins present in natural rubber latex, there has been a shift towards the use of synthetic latices that do not contain natural rubber latex proteins, especially for use in making medical devices that come into contact with the skin. Taking cost and performance into consideration, synthetic latices that are suitable for glove manufacture include nitrile latex and polyurethane latex for examination gloves, and polychloroprene latex and PI latex for surgical gloves. For surgical gloves, PI latex is preferred over polychloroprene, even though it is more expensive, because it provides the gloves with properties that mimic those of natural rubber, particularly tensile strength, ultimate elongation, softness and comfortable feel.

While the synthetic PI polymer is chemically similar to the PI polymer in natural rubber, there are some differences in the chemical structure of the polymer. In addition, there are also differences between the compositions of synthetic PI latex and natural rubber latex. Depending on the catalyst used for preparing the PI, synthetic PI contains about 90 to 98.5% cis-polyisoprene, 1 to 5% trans-polyisoprene and 0.5 to 5% other forms of polyisoprene. The PI in natural rubber comprises about 98% cis-polyisoprene and 2% trans-polyisoprene. In terms of overall composition, natural rubber latex comprises about 94% PI latex particles and about 6% non-rubber materials, whereas synthetic PI latex comprises about 97-99% PI latex particles and about 1-3% colloidal stabilizers. The colloidal stabilizers, such as surfactants or carboxylic acid soaps, help to keep the dispersed PI particles stable in the aqueous phase. The non-rubber materials in natural rubber comprise proteins, lipids, fatty acid soaps, etc. These non-rubber materials play an important role in the vulcanization of rubber in the latex and some are believed to have antioxidant properties.

Due to these differences between synthetic PI latex and natural rubber latex, in terms of both the compositions of the PI polymers and the overall compositions, the vulcanization formulation for crosslinking the PI polymers in the latices is different for each of the two types of PI latex. Since commercial synthetic PI latex is relatively new as compared to natural rubber latex, the amount of published information on the compounding formulations for synthetic PI latex is limited. A brief review is provided below.

Generally, the compounding formulation for vulcanization of rubber comprises the following classes of materials (a) crosslinking agents (usually sulfur or sulfur donors), (b) vulcanization accelerators, (c) vulcanization activators, and (d) antidegradants. For reference, the following abbreviations are used in this application: ZDEC—Zinc diethyldithiocarbamate, ZDBC—Zinc dibutyldithiocarbamate, ZDNC—Zinc diisononyldithiocarbamate, ZDBeC—Zinc dibenzyldithiocarbamate, TMTD—Tetramethyl thiuram disulfide, TETD—Tetraethyl thiuram disulfide, TBeTD—Tetrabenzyl thiuram disulfide, MBT—2-mercaptobenzothiozole, ZMBT—Zinc 2-mercaptobenzothiozole, DPTU—Diphenyl thiourea, DPG—Diphenyl guanidine, DIXP—diisopropylxanthogen polysulfide, DIX—Diisononyl xanthogen, XS—Xanthogen sulfide, Wingstay L—butylated reaction product of p-cresol and dicyclopentadiene, Aquanox L—aqueous dispersion of butylated reaction product of p-cresol and dicyclopentadiene, AO2246—2,2'-methylene-bis-(4-methyl-6-t-butylphenol). AO264—2,6-di-tert-butyl-4-methylphenol, and MMBI—4- and 5-methyl-2-mercapto-benzimidazole.

Henderson (*International Latex Conference* 2000, Akron, Ohio) disclosed a formulation using sulfur, three accelerators (ZDEC, ZMBT and DPG, each at a fixed level), zinc oxide, and an antioxidant (Wingstay L).

Wang et al. (U.S. Pat. No. 6,828,387) disclosed formulations using sulfur, three accelerators (ZDEC, ZMBT and DPG, at different ratios), zinc oxide, and an antioxidant (Wingstay L).

Sak et al. (U.S. Pat. No. 6,618,861) disclosed a formulation using sulfur and a sulfur donor (TMTD), four accelerators (ZMBT, ZDEC, ZDBC and DPTU, each at a fixed level), zinc oxide, and two phenolic type antioxidants (AO2246 and AO264).

Chakraborty et al, (*2nd International Rubber Glove Conference* 2004, Kuala Lumpur, Malaysia) disclosed formulations using sulfur, two combinations of two accelerators (ZDNC and DIXP, or ZDEC and MBT), zinc oxide, and two antioxidants (AO2246 and MMBI).

Webster et al. (*International Latex Conference* 2004, Akron, Ohio) disclosed formulations using sulfur, undisclosed accelerator systems, zinc oxide, and an undisclosed antioxidant.

Jole Van (WO 2007/017375) disclosed formulations using sulfur, two accelerators (ZDEC and DPG), zinc oxide, and an antioxidant (Aquanox L). Jole Van (WO 2007/017368) also disclosed formulations using sulfur, accelerators (DIXP, and alkyl dithiocarbamates of various chain lengths, such as ZDNC, and DPG), zinc oxide, and an antioxidant (Aquanox L).

Lucas (WO 2003/072340) disclosed formulations using sulfur, accelerators (various combinations comprising DIXP, DIX, XS, TETD, TBeTD, and ZDBeC), zinc oxide, and an antioxidant (Wingstay L).

Teoh et al, (U.S. Pat. No. 7,179,415) disclosed a neoprene article formed using sulfur, zinc oxide, and accelerators (Rhenocure, DPG, and ZDBC), from 1.0 to 3.0 phr of an antioxidant (e.g., Wingstay L), and from 0.5 to 2.0 phr of an anti-tack agent (e.g., Michem Lube-180).

Bourne et al. (U.S. Pat. No. 6,195,805) disclosed a neoprene article formed using a vulcanizer, an activator, an accelerator, from 0.25 to 5.0 phr of an antiozonant, and from 0.1 to 3.0 phr of an antioxidant. The neoprene articles were packaged in paper and then sterilized using gamma irradiation or electron beam sterilization.

Weikel et al. (U.S. Pat. No. 6,306,514) disclosed elastomeric flexible articles having a lubricant composition provided on the skin-contacting layer, in order to improve lubricity. The elastomeric base layer may be formed from a synthetic rubber latex emulsion that includes a sulfur or sulfur-containing vulcanizer, a zinc oxide activator, a dithiocarbamate accelerator, a phenol-type antioxidant, and an emulsified wax as an antiozonant.

Accordingly, there is a need in the art for methods of packaging and sterilizing elastomeric articles in a manner that prevents and/or minimizes degradation to the articles, particularly degradation that may be caused and/or accelerated by sterilization techniques such as gamma irradiation, x-ray irradiation, and electron-beam processing. There is also a need for packaged elastomeric articles produced according to the methods of the invention. Such packaged elastomeric articles exhibit improved degradation-resistance as compared to elastomeric articles that are not packaged in accordance with the methods of the present invention. The packaged elastomeric articles beneficially exhibit a reduced incidence of cracking and discoloration, regardless of whether they are subjected to sterilization techniques.

SUMMARY OF THE INVENTION

It has been discovered that elastomeric articles, especially those formed from polymers other than natural rubber, such as those having unsaturations in the polymer chain, and particularly synthetic PI, can show signs of degradation by ozone and other degradants (e.g., oxygen and reactive oxygen species) even when they remain in an unopened package. The degradation can be particularly problematic when the elastomeric articles have been subjected to radiation-based sterilization techniques.

The present invention meets the unmet needs of the art, as well as others, by providing methods for packaging elastomeric articles so that they are more degradation-resistant, and exhibit reduced cracking and/or discoloration (which may take the form of a whitish surface discoloration), particularly after being subjected to sterilization or other processes that accelerate degradation of elastomers. The present invention is further directed towards methods of reducing degradation of elastomeric articles that may be subjected to sterilization techniques. Such elastomeric articles may contain antidegradants, such as antioxidants and/or antiozonants, and may be provided in a package that maintains a reduced-oxygen environment therein, in order to provide resistance to degradation. The elastomeric articles and methods of the invention are particularly beneficial for avoiding problems associated with degradation in synthetic PI latex articles.

According to one aspect of the invention, the invention relates to a method of packaging an elastomeric article which prevents and/or reduces degradation of the elastomeric article. The method includes providing one or more antidegradants, such as antiozonants and/or antioxidants, in the elastomeric article, placing the elastomeric article in a package, preferably comprising a low-oxygen-permeable material, removing oxygen from within the package to form a reduced-oxygen environment inside the package, preferably by exposing the package to a vacuum of 250 mbar or less, and sealing the package to provide the elastomeric article within the reduced-oxygen environment inside the package. The elastomeric article provided within the package may be subject to a sterilization procedure, preferably by a process comprising radiation.

An additional aspect of the invention relates to packaged, degradation-resistant elastomeric articles that include an elastomeric article formed from an elastomer comprising an unsaturated polymer and also comprising an antidegradant such as an antiozonant and/or antioxidant, and a package comprising a low-oxygen-permeable material. The elastomeric article is provided inside the package, and the environment inside the package has a reduced oxygen level as compared to the environment outside the package. According to further aspects, the elastomer may be polyisoprene. In certain aspects, the packaged elastomeric articles exhibit synergistically improved degradation-resistance as compared to elastomeric articles that do not comprise the antidegradant and/or are not packaged in accordance with the methods of the present invention. In certain aspects, the elastomeric articles may be sterile.

Another additional aspect of the invention relates to a method of packaging an elastomeric article, including providing one or more antidegradants, such as antiozonants and/or antioxidants, in the elastomeric article; placing the elastomeric article in a package, where the package preferably has a volume that is reduced compared to a standard package; removing oxygen from within the package to form a reduced-oxygen environment inside the package, preferably by exposing the package to a vacuum of 320 mbar or less; and sealing the package to provide the elastomeric article within the reduced-oxygen environment inside the package. The elastomeric article provided within the package may be subject to a sterilization procedure, preferably by a process comprising radiation. According to certain aspects, the package having a reduced volume may have a volume of about 335 cm$^3$ or less, 280 cm$^3$ or less, or 225 cm$^3$ or less. According to still further aspects, the method of packaging an elastomeric article is contained in a reduced-oxygen environment that contains less than 20 cm$^3$ of trapped oxygen, preferably less than 16 cm$^3$ of trapped oxygen, more preferably less than 14 cm$^3$ of trapped oxygen.

According to another aspect, the invention relates to a method of packaging an elastomeric article, including providing one or more antidegradants, such as antiozonants and/or antioxidants, in the elastomeric article; placing the elastomeric article in a package; removing oxygen from within the package to form a reduced-oxygen environment containing less than 20 cm³ of trapped oxygen inside the package; and sealing the package to provide the elastomeric article within the reduced-oxygen environment. According to certain aspects, the reduced-oxygen environment contains less than 16 cm³ of trapped oxygen. According to still further aspects, the reduced oxygen environment contains less than 14 cm³ of trapped oxygen. Providing the elastomeric article in the reduced oxygen environment beneficially results in reduced ozone attack during sterilization, especially radiation sterilization such as gamma irradiation.

According to a further aspect, the invention relates to a packaged elastomeric article including an elastomeric article comprising one or more antidegradants; a reduced-oxygen environment surrounding said elastomeric article, comprising less than about 20 cm³ of trapped oxygen; and a package comprising a low-oxygen-permeable material. The package maintains the reduced-oxygen environment surrounding the elastomeric article.

Other novel features and advantages of the present invention will become apparent to those skilled in the art upon examination of the following or upon learning by practice of the invention.

DETAILED DESCRIPTION OF THE PREFERRED EMBODIMENTS

The methods of packaging elastomeric articles beneficially permit the elastomeric articles to exhibit synergistically improved degradation-resistance as compared to elastomeric articles that do not comprise the antidegradant and/or are not packaged in accordance with the methods of the present invention. The packaged, degradation-resistant elastomeric articles that are provided by the present invention overcome the obstacles discussed above.

The following definitions are provided to clarify the meaning of specific terms:

A "dispersion" is an intermediate between a true solution and a mixture, or suspension. It can also be considered an "emulsion," which consists of two liquid phases, a "dispersed phase" of microscopic globs, which are distributed throughout the "dispersing phase." In oil in water dispersion (O/W), the dispersing phase is also named the "aqueous phase." The dispersed phase of the emulsion used to form the elastomeric articles of the present invention is generally referred to as a synthetic colloidal polymer, wherein the polymer may be prepared via emulsion polymerization (nitrile, polychloroprene), coordination (Ziegler-Natta) polymerization (cis-polyisoprene) or anionic polymerization (cis-polyisoprene).

"Latex" was originally referred to as a sap from a rubber tree for making rubber products. Thus, dispersions, emulsions and latex are all considered to be kinetically stable, colloidal systems and these terms may be used interchangeably.

"Sterilization" refers to any process used to kill or eliminate transmissible agents, including, but not limited to, fungi, bacteria, viruses, spores, etc. Sterilization techniques may include one or more chemical, radiation, and other techniques, with radiation sterilization being particularly preferred in the present invention.

Preferably the sterilization technique is adequate to kill or restrict the growth of one or more of the following microbes: coagulase-negative Staphylococci, Enterococci, fungi, *Candida albicans, Staphylococcus aureus, Enterobacter* species, *Enterococcus faecalis, Staphylococcus epidermidis, Streptococcus viridans, Escherichia coli, Klebsiella pneumoniae, Proteus mirabilis, Pseudomonas aeruginosa, Acinetobacter baumannii, Burkholderia cepacia*, Varicella, *Clostridium difficile, Clostridium sordellii*, Hepatitis A, Hepatitis B, Hepatitis C, HIV/AIDS, methicillin-resistant *Staphylococcus aureus* (MRSA), mumps, norovirus, parvovirus, poliovirus, rubella, SARS, *S. pneumoniae* (including drug resistant forms), vancomycin-intermediate *Staphylococcus aureus* (VISA), vancomycin-resistant *Staphylococcus aureus* (VRSA), and vancomycin-resistant Enterococci (VRE). It is considered to be within the ability of one skilled in the art to determine the type of sterilizing agent and amount necessary to achieve adequate sterilization of the article.

According to certain aspects the sterilizing agent is radiation, where the sterilizing radiation is selected from gamma irradiation, electron beam sterilization, or X-ray irradiation. According to one aspect, a packaged elastomeric article may be sterilized by gamma irradiation at a radiation dosage of between 10 kGy and 60 kGy, preferably between 20 kGy and 50 kGy, and more preferably between 29.0 kGy and 43.5 kGy.

Elastomer Dispersions

The elastomeric articles of the present invention may be produced using any conventional manufacturing methods, e.g., coagulant dipping. These methods utilize dispersions containing the elastomer from which the article is to be formed. Preferred elastomers include natural rubber, polyurethane, polybutadiene, polychloroprene (neoprene), nitrile rubber, block copolymers of styrene and butadiene, block copolymers of styrene and isoprene, and polyisoprene. According to certain aspects, a particularly preferred elastomer is polyisoprene.

The dispersions may also contain one or more different compounding agents, including antidegradants such as antiozonants and/or antioxidants. The elastomeric articles formed from the dispersion have an antidegradant incorporated therein or thereon in an amount sufficient to prevent and/or reduce the article from exhibiting signs of degradation, such as cracking and discoloration. In some aspects, the discoloration is present on the surface of the article, and may be whitish in color. The concentration of antidegradants, such as antioxidants and/or antiozonants, that will be required to prevent and/or reduce degradation, particularly oxidative and ozone degradation, will vary based on the particular antidegradant being used, the type of polymer, the amount of oxygen, ozone, and other reactive oxygen species to which the polymer is exposed, and the type of sterilization techniques to which the article is subjected.

According to some aspects, an antiozonant is added to an elastomer dispersion that is used to make the elastomeric articles of the invention. Ozone can severely damage some elastomeric articles, such as those formed from polymers that are highly unsaturated, like polyisoprene. When included in the aqueous elastomer dispersion of the invention, certain high molecular weight polymers, such as waxes, EPDM and hydrogenated polydiene can provide such articles with excellent ozone resistance. Waxes form a physical barrier at the surface of the rubber which protects against ozone attack. There are two types of waxes: straight chain paraffin waxes and branched-chain microcrystalline waxes. The most widely used antiozonant waxes are blends of paraffin and microcrystalline waxes for maximum protection over a broad range of exposure temperatures. Paraffin waxes are straight-chain hydrocarbon molecules containing about 20 to 50 carbon atoms. Suitable paraffin waxes have a melting point of from about 50 to 75° C., preferably 52 to 68° C. Microcrystalline waxes are also known as amorphous waxes and are hydrocarbons, similar to paraffin waxes, but the carbon chains are branched and have higher molecular weight of about 40 to 70 carbon atoms per chain. Other examples of antiozonants that may be used in the invention may include, but are not limited to alkyl/aryl p-phenylenediamines such as N-1,3-dimethylbutyl-N'-phenyl-p-phenylenediamine 6PPD, organoclay-antiozonant complexes such as smectite-containing clay with alkyl-aryl-p-phenylenediamine, functionalized benzotriazoles such as N,N-disubstituted para-phenylenediamine, triazines such as tris (N-1,4-dimethylpentyl-p-phenylenediamino) 1,3,5-triazine and tris (N-alkyl-p-phenylenediamino) 1,3,5-triazine, and p-phenylenediamines such as N-isopropyl-N'-phenyl-p-phenylenediamine (IPPD). In addition, polymers including waxes such as paraffinic wax (MW=300-500), microcrystalline wax (MW=600-700) (with paraffinic wax) and low MW PE wax (MW=100-1100), polymeric antiozonants such as polymeric diphenyldiamine, and ozone inert polymers such as EPDM and brominated isobutylene/para-methylstyrene copolymer (BIMSM) may be used as antiozonants. It is preferred that waxes are used. Once particularly preferred wax is Michem Lube 180. Michem Lube 180 is a blend of carnauba wax and paraffin wax. Carnauba wax is a wax of the leaves of the palm *Copernicia prunifera*, also known as the fan or carnauba palm. The wax is collected from the leaves of the carnauba palm by collecting them, beating them to loosen the wax, then refining and bleaching the wax. Another preferred wax dispersion is Antilux 600. Any amount of antiozonant that is sufficient to prevent and/or reduce ozone degradation of the finished elastomeric article may be included in the elastomer dispersion, for example, from 1.0 to 7.0 phr, more preferably from 2.0 to 6.0 phr, more preferably from 3.0 to 5.0 phi, and most preferably about 4.0 phr.

Suitable antioxidants that may be added to the elastomer dispersion include, but are not limited to, hindered phenols such as butylated hydroxytoluene (2,6-di-tert-butyl-4-methylphenol) and thiodiethylene bis-di-t-butyl-4-hydroxyphenyl propionate, hindered polyphenolics such as butylated reaction products of p-cresol and dicyclopentadiene, hindered phenol/hindered polyphenolics such as trimethyl-tris (di-t-butyl-4-hydroxybenzym)-benzene or octadecyl di-t-butyl-4-hydroxyphenyl propionate, amines such as a blend of 6PPD with methyl styrene and bis-alpha-dimethylbenzyl diphenyl amine, mixtures such as zinc mercaptotulumimidazole/phenolic, triazinone derivatives such as triazinonephenol mixtures, polyaromatic amines such as poly(m-anisidine), phenolic antioxidant hydrazides such as phenolics with anhydride copolymer, phenolics such as 2,2'-methylene-bis-(4-methyl-6-t-butylphenol), cresols such as 2,4-dimethyl-6-(1-methylcyclohexyl)-p-cresol, and styrenated phenols. One particularly preferred antioxidant is butylated reaction products of p-cresol and dicyclopentadiene (e.g., Wingstay L), Any amount of antioxidant that is sufficient to prevent and/or reduce oxidation of the finished elastomeric article may be included in the elastomer dispersion, for example, from 0.5 to 5.0 phr, more preferably from 1.0 to 4.0 phr, more preferably from 1.5 to 3.0 phi, and most preferably about 2.0 phr.

The elastomeric articles of the present invention may be formed using elastomer dispersions containing any additional components that may be used in conventional elastomer formulations, such as surfactants, pH adjusting agents, and other adjuvants. The amount of these components is typically not more than about 10%, and is preferably about 2-10% by weight of total dispersion phase solids.

Additives may be used in forming the elastomeric articles, and may include at least one of curing ingredients, non-curing ingredients, and additional polymers, to be discussed below, with the same, similar or different chemical structures from the elastomer. The total amount of additive(s) used is about 0.5-49% by weight of total dispersion phase solids.

The curing ingredients may include any such ingredients found in conventional elastomer dispersion compounding formulations. For example, the curing ingredients may include, but are not limited to, sulfur/sulfur donors, accelerators (primary and secondary), and sulfur-curing (or vulcanization) activators and peroxide curing/crosslinking agents which are known to those skilled in the art.

When curing using sulfur, the main curing agent preferably comprises elemental sulfur (generally believed to be in the form of S8, but not so limited). This may be used alone or in combination with a sulfur donor. A sulfurless system can also be used, but this requires a sulfur donor, Sulfur donors may include, but are not limited to thiuram polysulfides such as tetramethylthiuram disulfide and tetreethylthiuram disulfide, which also function as vulcanization accelerators, and xanthogen polysulfides such as butylxanthogen disulfide, CPB, diisopropyl xanthogen polysulfide DIXP, and diisopropyl xanthogen disulfide.

Accelerators may include, but are not limited to, dithiocarbamates such as zinc dimethyl dithiocarbamate (ZDMC), zinc diethyldithiocarbamate (ZDEC), zinc dibutyl dithiocarbamate (ZDBC), zinc dibenzyl dithiocarbamate (ZBEC) and zinc pentamethylene dithiocarbamate (ZPD), thiazoles such as 2-mercaptobenzothiazole (MBT), sodium 2-mercaptobenzothiazole (SMBT) and zinc 2-mercaptobenzothiazole (ZMBT), thiuram sulfides such as tetramethyl thiuram disulfide (TMTD), tetraethyl thiuram disulfide (TETD and tetrapentamethylene thiuram disulfide (TPTD), guanidines such as diphenylguanidine (DPG) and di-o-tolyguanidine (DOTG), and thioureas such as thiourea and diphenyl thiourea. One or more accelerators may be used to formulate the elastomer dispersion of the invention.

Activators may include, but are not limited to, zinc oxide, magnesium oxide and lead oxide. Zinc oxide is the most commonly used vulcanization activator. A single accelerator or a synergistic combination of accelerators may be used.

Any non-curing ingredients that are conventionally used in elastomer dispersion compounding formulations may be used in the present invention. For example, the non-curing ingredients may include, but are not limited to, antioxidants, stabilizers, plasticizers, anti-ozone agents, pigments, and fillers.

Colloidal stabilizers including alkalis for pH adjustment, surfactants and alkaline caseinates such as sodium caseinate may also be added to the aqueous phase.

Suitable plasticizers that may be added to the elastomer dispersion may include, but are not limited to, fatty salts, mineral oils and ester plasticizers.

Suitable pigments that may be added to the aqueous elastomer dispersion may include a wide range of natural pigments such as titanium dioxide and iron oxides, and synthetic pigments.

Suitable fillers that may be added to the aqueous elastomer dispersion may include, but are not limited to, inorganic fillers such as clays, calcium carbonate, talc, and silica and organic fillers such as crosslinked polymethyl methacrylate, finely divided urethane resin particles and polyethylene microspheres.

Commercially available PI latex such as Kraton IR401 from Kraton Corporation (Houston, Tex.), Isolex available from Medline Industries (Mundelein, Ill), Aqualast 501 available from Lord Corporation (Erie, Pa.) and LIR-700 available from Kuraray (Japan) may be used to prepare elastomeric articles such as gloves, specifically medical gloves, and more specifically examination and surgical gloves. However, it is considered within the ability of those skilled in the art to prepare alternative degradation-resistant elastomeric articles other than gloves, including, but not limited to, condoms, probe covers, dental dams, finger cots, catheters, and the like, using the guidance provided herein.

Packaging of Elastomeric Articles

The finished elastomeric articles formed from the elastomer dispersion may also be packaged to reduce the amount of oxygen, ozone, and reactive oxygen species that are present in the package with the elastomeric article. The present invention encompasses methods of packaging and/or preserving any articles formed from elastomers.

Regardless of the type of elastomeric article or the specific packaging technique, before the outer package is sealed, preferably as much air as possible is removed from the package to provide a reduced-oxygen environment for the elastomeric article provided within the package, as compared to the environment outside the package. This may be done by using one or more of the following techniques:

(a) Removing air from an enclosed compartment (or chamber) in which an elastomeric article, which may optionally be wrapped in an inner packet, is placed. The elastomeric article may be sandwiched between a top web film and a bottom web film (which may be provided, for example, in the form of a shallow tray) before sealing the film with heat and pressure to form the outer package. Air may be sucked out from the enclosed compartment (or chamber) by connecting it to a vacuum pump or other apparatus before sealing the outer package. This method of packaging is referred to as thermo "form fill seal" packaging.

(b) Mechanically squeezing out air from the unsealed package including the elastomeric article, which optionally may be wrapped in an inner packet. The elastomeric article then may be sandwiched between a top web film and a bottom web film to form the unsealed package before sealing the package with heat and/or pressure. This method of packaging is referred to as "platen seal" packaging.

(c) Flushing air out of the unsealed package with an inert gas, such as nitrogen, before sealing the package. This may be done using a "form fill seal" packaging machine where inert gas is used instead of applying a vacuum to remove the air/oxygen.

Any packaging material and/or technique that is capable of maintaining a reduced-oxygen environment within the package may be used in accordance with the present invention.

Standard packaging techniques for elastomeric articles, such as gloves, expose the package to a reduced pressure of about 320 mbar. Elastomeric articles that are packaged under this pressure level show cracking due to ozone attack during sterilization, especially gamma irradiation sterilization. However, according to the invention, it has been found that exposing the package to a vacuum pressure lower than 320 mbar, such as 250 mbar or less, preferably 220 mbar or less, more preferably 190 mbar or less, or a pressure between 180 mbar to 220 mbar, is useful for overcoming the problem of cracking due to ozone attack during sterilization, especially radiation sterilization such as gamma irradiation. Preferably, a reduced-oxygen environment is produced that contains about 30% or less, preferably about 20% or less, of the oxygen that was present (or theoretically would have been present) in the package at atmospheric pressure and room temperature, prior to the removal of the oxygen.

According to other aspects of the invention, it has been found that packaging the elastomeric articles in a package having a reduced volume as compared to a standard package, and exposing the package to a reduced pressure of about 320 mbar or less, or about 250 mbar or less, or about 220 mbar or less, or about 180 mbar or less, is also useful for overcoming the problem of cracking due to ozone attack during sterilization, especially radiation sterilization such as gamma irradiation. According to some aspects, and particularly when the elastomeric article is a glove (which may have a volume of, e.g., from about 25 $cm^3$ to about 30 $cm^3$), the volume of the package having a reduced volume may be about 335 $cm^3$ or less (i.e., about 332 $cm^3$), preferably about 280 $cm^3$ or less (i.e., about 277 $cm^3$), and more preferably 225 $cm^3$ or less (i.e., about 222 $cm^3$). Preferably, regardless of the specific combination of package volume and reduced pressure level, the packaged elastomeric article is contained in a reduced-oxygen environment that contains less than 20 $cm^3$ of trapped oxygen, preferably less than 16 $cm^3$ of trapped oxygen, more preferably less than 14 $cm^3$ of trapped oxygen.

According to further aspects of the invention, it has been found that packaging the elastomeric articles, preferably gloves, in a package that contains less than 20 $cm^3$ of trapped oxygen, preferably less than 16 $cm^3$ of trapped oxygen, more preferably less than 14 $cm^3$ of trapped oxygen, results in reduced ozone attack during sterilization, especially radiation sterilization such as gamma irradiation. This beneficial reduction in ozone degradation occurs regardless of the specific method of packaging used to remove oxygen from the package.

Any packaging material and/or technique that is capable of maintaining a reduced-oxygen environment within the package may be used in accordance with the present invention.

Low-oxygen-permeable materials are those that have an oxygen transmission rate of less than about 1000 $cm^3 \cdot mil/100 \ in^2 \cdot day \cdot atm$, preferably less than 900 $cm^3 \cdot mil/100 \ in^2 \cdot day \cdot atm$, more preferably less than 500 $cm^3 \cdot mil/100 \ in^2 \cdot day \cdot atm$, and most preferably less than 250 $cm^3 \cdot mil/100 \ in^2 \cdot day \cdot atm$, measured at 77° F. and 0% R.H. Suitable such materials that may be useful for packaging elastomeric articles include but are not limited to polyethylene (or polythene) and nylon-based multi-layer films. Nylon is a generic designation for a family of synthetic polymers known as polyamides (PA).

Polyethylene (PE) is a thermoplastic polymer of long chains of the monomer ethylene. PE is classified into several categories based on its density and branching, and the types of PE considered most useful for glove packaging include high density polyethylene (HDPE), low density polyethylene (LDPE), and linear low density polyethylene (LLDPE). In some aspects of the invention, HDPE may be defined by a density of greater or equal to 0.941 $g/cm^3$, LDPE may be defined by a density range of 0.910-0.940 $g/cm^3$, and LLDPE may be defined by a density range of 0.915-0,925 $g/cm^3$.

Ethylene vinyl acetate (EVA) is a copolymer of ethylene and vinyl acetate (VA). The weight percent of VA usually varies from about 10 to about 40%, with the remainder being ethylene. It is a hot melt adhesive and may be blended with LDPE or LLDPE to provide it with adhesive properties during heat sealing of the package.

Oxygen transmission rate of various plastic films are given below in Table 1.

TABLE 1

|  | LDPE | HDPE | LLDPE | >12% VA EVA | Nylon |
|---|---|---|---|---|---|
| Oxygen Transmission Rate* | 250-840 | 30-250 | 250-840 | 515-645 | 2.6 |

*Oxygen transmission rate was measured in units of $cm^3 \cdot mil/100\ in^2 \cdot day \cdot atm$, at 77° F. and 0% R.H.

According to some aspects, the package may also comprise one or more compounds that reduce oxygen, ozone, and/or reactive oxygen species from the environment inside the package. The compound(s) may be provided separately within the package, or may be incorporated into the package material itself.

For example, when the elastomeric articles are gloves, the packaging may be carried out as follows: A pair of powder-free gloves, a right hand and a left hand, are manually cuffed down (by inverting the cuff inside-out) about 10 cm so that the inside surface of the cuff is exposed to the outside. The left hand glove is laid flat in the left side of the inner web film (or paper) with the thumb exposed outward and the film wrapped around the glove. Similarly, the right hand glove is laid flat in the right hand side of the inner web film with the thumb exposed outward and the paper wrapped around the glove. One wrapped glove is then flipped over the other to produce a rectangular wallet-shaped packet or wallet. This packet is then packed inside another outer package comprising a bottom web film and a top web film which is heat and pressure sealed on all sides.

In one embodiment of the invention, a tray measuring about 235 mm length, about 118 mm width, and about 12 mm height is thermally formed on a bottom web film using a forming die having these dimensions. A pair of gloves wrapped in an inner packet is loaded onto the tray and a top wrap film is laid over the tray to form an unsealed package. The unsealed package is moved to a compartment (or chamber) which is then closed. The compartment is connected to a vacuum pump. The vacuum pump is switched on to suck out oxygen from the compartment. When the pressure of the air in the compartment drops to the required value (e.g., 180 mbar), the sides of the package are thermally sealed. The packaged glove is moved out from the compartment while simultaneously another unsealed package is moved into the compartment. The edges of the sealed package are trimmed off to provide a pair of packaged gloves in a sealed package. This may be performed as a continuous operation. One example of a machine for carrying out this process is made by Tiromat Powerpack.

These and other aspects of the invention are further described in the non-limiting Examples set forth below.

EXAMPLES

Example 1

Preparation of a Polyisoprene Glove

PI Blue polyisoprene latex was compounded according to the formulation given in Table 2. The polyisoprene latex was diluted with water, and sodium caseinate solution was then added to the mixture and stirred at ambient temperature. While under continuous stirring, zinc oxide and sulfur dispersions were added to the mixture. This was followed by addition of accelerator dispersions, ZDEC, ZMBT, and DPG, and then Wingstay L, $TiO_2$ dispersions, and then Match Blue MPLB pigment. The pH was adjusted to about 11.0 to 11.5 with ammonium hydroxide or potassium hydroxide solution. Michem Lube 180 dispersion (pH adjusted to 11.0 to 11.5) was then added. The composition was then diluted to about 32.5% solids using soft water. The composition was maintained at a temperature of 25° C. and stored under continuous agitation for 24 hours at a temperature of less than 25° C.

A cleaned glove former was heated in an oven at a temperature of about 100° C. for a period of about 65 seconds so that it reached a temperature of about 58° C. It was then removed from the oven and dipped into a coagulant (prepared according to the formulation given in Table 3) maintained at a temperature of 56° C. for a period of 29 seconds, and then removed. The coagulant-coated former was placed in a drying oven at a temperature of 100° C. for a period of time sufficient to dry the coagulant.

The coagulant-coated former was removed from the oven and dipped into the compounded polyisoprene latex maintained at a temperature of 25° C. for a period of 26 seconds. The coated former was removed and placed into a preheated oven at a temperature of 130° C. for a period of 55 seconds.

The coated former was then removed from the oven and placed into water leaching tank at a temperature of 60° C. for a period of 4.5 minutes. The former was removed from the leaching tank and placed into an oven at a temperature of 70° C. for 30 seconds.

The former was removed from the oven and dipped into a tank containing silicone emulsion at a temperature of 50° C. The former was removed from the silicone tank and while still on the former, the glove was beaded at the cuff using a beader roller.

The former was then placed into a series of ovens for drying and curing the glove where the glove moved therethrough at zone temperatures ranging from 110 to 135° C. for a total time period of 11.4 minutes. After exiting the curing oven, the glove was subjected to a post-cure leaching. At this step, the glove was rinsed with water at a temperature of 70° C. for a period of about 1 minute.

The glove was placed in a slurry tank at a temperature of 55° C. for 30 seconds. The slurry composition contained 85.2% water, 14.33% starch, 0.4% hydroxyethyl cellulose (Cellosize™ QP 52000), 0.4% sodium hypochlorite, 0.01% surfactant (Darvan#1) and 0.02% Casatab™ T. The former was then placed into a post-slurry oven to dry the glove, thereby producing the final formed glove. The glove-covered former was cooled and the glove was stripped therefrom.

A control PI Blue glove without Michem Lube 180 was made in a similar way as described above, except that Michem Lube 180 was omitted from the formulation shown in Table 2. The preparation of polyisoprene gloves is further described in U.S. Pat. No. 6,828,387 to Wang et al., which is incorporated herein by reference.

TABLE 2

| Latex Formulation | |
|---|---|
| Ingredient | Parts (phr) dry weight |
| Polyisoprene | 100.00 |
| Soft water to dilute latex | |
| Sodium caseinate | 0.75 |
| ZnO | 0.50 |
| Sulfur | 1.25 |
| ZDEC | 0.50 |
| ZMBT | 0.50 |

TABLE 2-continued

Latex Formulation

| Ingredient | Parts (phr) dry weight |
| --- | --- |
| DPG | 1.00 |
| Wingstay L | 2.00 |
| TiO2 | 1.00 |
| Match Blue MPLB | 0.35 |
| Michem Lube 180 | 4.00 |
| Ammonium hydroxide or Potassium Hydroxide for adjusting | pH > 11.0 |

Final total solids content of latex = 32.5%

TABLE 3

Coagulant Formulation

| Ingredient | % Weight |
| --- | --- |
| Calcium carbonate | 3.60 |
| Calcium nitrate | 14.7 |
| Surfynol TG | 0.20 |
| Cellosize | 0.06 |
| Soft water | 81.44 |

The gloves were post-processed by chlorination, which removed powder from the gloves and modified the glove internal surface to improve donning and reduced the grip on the external surface. The gloves may be chlorinated one time where the gloves are inverted to expose the internal surface for direct chlorination after which they are partially dried and then re-inverted to the original configuration before final drying. Alternatively, if a lower external surface grip is required, the gloves may undergo two rounds of chlorination, one round for the external surface and one round for the internal surface, PI Blue gloves underwent two rounds of chlorination as described below.

The formed gloves were loaded into a chlorinator where they were washed by tumbling with water for 3 minutes for two cycles. The gloves were then chlorinated in an aqueous solution of chlorine at a chlorine strength of about 300-350 ppm for 8.3 minutes. At the end of the chlorination cycle, any residual chlorine was neutralized by addition of caustic soda solution such that the pH of the neutralized solution was about 8 or above. The gloves were tumbled for 4 minutes before the solution was drained off. The gloves were then washed by tumbling with water for five times for three minutes each time.

The gloves were then placed in a centrifugal water extractor where excess water was extracted out. The gloves were then manually inverted thereby exposing the internal donning surface outside. The inverted gloves were then loaded back into the chlorinator where they underwent another round of chlorination of the internal surface at a chlorine strength of about 300-350 ppm for 8.3 minutes. At the end of the chlorination cycle, residual chlorine was neutralized with caustic soda solution and the gloves washed five times with water as per the first chlorination cycle.

After chlorination, the wet gloves were transferred to a water extraction machine and excess water was removed by centrifuging. In order to improve the donning of the gloves on moist hands (damp donning), the gloves were coated with a lubricant. The gloves were coated by loading them into a washer where they were tumbled with an aqueous solution containing cetyl pyridium chloride (1.56%), silicone SM2140 (0.5%) and ammonium salt of alkyl phosphate (1.0%). The gloves were dried in a cyclone dryer at about 55° C. for about 35 minutes.

Surface modification of elastomeric articles using lubricants is further described in U.S. Pat. No. 7,566,502 B1 to Chen et al., which is incorporated herein by reference.

The dried gloves were additionally coated with a therapeutic, moisturizing composition containing glycerol (92.24%), citric acid (0.39%), d-sorbitol (2.91%), pantothenol (1.94%), glucono-d-lactone (0.97%), and sodium citrate dehydrate (1.55%). The composition was heated to about 90° C. and then sprayed onto the gloves in a tumbler dryer. At the end of the spraying cycle, the gloves were further dried at 60° C. for about 25 minutes. The cooled gloves were then inverted manually whereby the donning surface of the gloves was now on the inside. This therapeutic coating composition and method for coating of gloves is further described in U.S. Published Appl. No. 2008/0020023 by Wang et al., which is incorporated herein by reference.

The thickness of the finished gloves was measured to be 0.19 mm at the cuff, 0.21 mm at the palm, and 0.22 mm at the fingers.

The gloves are now ready for packaging.

The following calculations are provided as an estimation of the maximum amount of oxygen trapped in the package at atmospheric pressure (1013.25 mbar), and at reduced pressures of 320 mbar, 220 mbar and 180 mbar.

The volume of air trapped in the bottom web tray and the top web that form the package without gloves (assuming tray volume is the same as that of the forming die; this would be the maximum volume)=$1.2 \times 11.8 \times 23.5$ cm$^3$=332.76 cm$^3$.

Weight of 1 pair of size 7.5 gloves (i.e., two gloves)=$2 \times 12.7$ g=25.4 g

Volume of 1 pair of size 7.5 gloves (density 0.93 g/cm$^3$)=$25.4 \div 0.93$=27.32 cm$^3$ Weight of inner wrap=5.9 g Volume of inner wrap (density=0.94 g/cm$^3$)=$5.9 \div 0.94$=6.28 cm$^3$ Volume of trapped air in 1 pair of packed gloves at atmospheric pressure=$332.76 - 27.32 - 6.28$=299.16 cm$^3$ Taking the percentage of oxygen in the air as 20.946%, and atmospheric pressure as 1013.25 mbar, the volume of oxygen trapped in 1 pair of packaged glove at atmospheric pressure=$(299.16 \times 20.946) \div 100$=62.66 cm$^3$. At a pressure of 320 mbar, volume of trapped oxygen=$(62.66 \times 320) \div 1013.25$=19.79 cm$^3$. At a pressure of 220 mbar, volume of trapped oxygen=$(62.66 \times 220) \div 1013.25$=13.60 cm$^3$. At a pressure of 180 mbar, volume of trapped oxygen=$(62.66 \times 180) \div 1013.25$=11.13 cm$^3$.

Another way to reduce the volume of trapped oxygen is by reducing the dimension of the forming die. For example, the depth of the forming die could be reduced to 10 mm (1.0 cm) or 8 mm (0.8 cm), and the volume of trapped oxygen can be estimated following the above method. The results of these calculations are shown below.

TABLE 4

| | Volume (cm$^3$) of oxygen tapped at various pressures | | | | |
| --- | --- | --- | --- | --- | --- |
| Die/Tray dimension | 1013.25 mbar | 320 mbar | 250 mbar | 220 mbar | 180 mbar |
| 0.8 cm × 11.8 cm × 23.5 cm | 39.43 | 12.45 | 9.73 | 8.56 | 7.00 |
| 1.0 cm × 11.8 cm × 23.5 cm | 51.05 | 16.12 | 12.60 | 11.08 | 9.07 |
| 1.2 cm × 11.8 cm × 23.5 cm | 62.66 | 19.79 | 15.46 | 13.60 | 11.13 |

Example of package top web film: HDPE film such as PHK331 (supplied by Amcor Flexibles, HDPE/Peel 30) is a white multi-layer peelable top web, using a peelable polymer layer. The film provides an easy peel open pack when used as a top web in horizontal form/fill/seal packaging of sterile medical devices. This film has a thickness of 3 mil.

Examples of package bottom web film: MD Film (Amcor Flexibles; EVA/LLDPE blend/EVA) is a high performance, olefin based multi-layer film having a thickness of 3.5 mil, and is specially suited for thermoforming applications such as forming the bottom web tray. MD films seal well to a range of heat seal coated materials.

NCS 70 Film (Amcor Flexibles, PE/PA/PE) is a high performance, nylon based multilayer film having a thickness of 70 μm, and is specially suited for thermoforming applications and seals well to a range of heat seal coated materials.

The packaged gloves are then sterilized by gamma irradiation at a dosage of from 29.0 kGy to 43.5 kGy.

Example 2

Effect of Antiozonant on Degradation Cracking

It is known that for a rubber article, any surface that is subjected to mechanical stress is more prone to degradation or attack by ozone than a non stressed surface. An ozone-degraded surface would show surface cracking, the extent of which is dependent on the amount of ozone that attacks the surface. For a packed glove sterilized as described earlier, the surface that is subjected to more mechanical stress is along the fold line of the cuff. More specifically, the two corners of the folded cuff are the two points subjected to the highest mechanical stress and are therefore most susceptible to ozone attack. This is found to be true for gloves packed with sufficient air (or oxygen) trapped in the package and then sterilized with gamma irradiation where the two corners of the folded cuff would show surface cracking. For a blue color glove such as PI Blue, the cracking at the two corners of the folded cuff could show up as whitish spots if the cracking is severe. The extent of surface cracking can be more clearly seen under a light microscope at 50 times magnification (or other higher or lower magnification) and the degree of cracking can be subjectively rated.

The procedure for examining surface cracking under a light microscope is as follows. The outer package of a pair of packed gloves is opened by peeling and the gloves are taken out from the inner wallet. The glove is turned inside-out to expose the inside donning surface and the two corners of the folded cuff are marked with a ballpoint pen, each corner with a square of about 3 to 4 mm to identify the spots so that they can be easily located under the microscope. The surface to be examined is then placed under the microscope set at 50 times magnification and the surface is appropriately illuminated so that the surface is clearly visible and any cracking on the surface is clearly distinguished.

Data obtained by examining gloves for surface cracking are shown in Table 5. These data are used to generate the mean values for surface cracking ratings that are shown in Tables 7 and 8.

TABLE 5

PI Blue -Cracking Ratings Raw Data

| | | Set A Ageing condition | | | | | | | |
|---|---|---|---|---|---|---|---|---|---|
| | | Unaged | | | | Aged 70 C., 7 days | | | |
| | | Glove type | | | | | | | |
| | | PI Blue with Michem Lube | | PI Blue w/o Michem Lube | | PI Blue with Michem Lube | | PI Blue w/o Michem Lube | |
| | | Experiment | | | | | | | |
| | | MU180 | MU320 | NU180 | NU320 | MA180 | MA320 | NA180 | NA320 |
| | | Packaging condition | | | | | | | |
| piece# | point# | 180 mbar | 320 mbar | 180 mbar | 320 mbar | 180 mbar | 320 mbar | 180 mbar | 320 mbar |
| 1 | 1 | 1.0 | 1.0 | 1.0 | 3.5 | 1.0 | 1.5 | 2.0 | 4.0 |
| | 2 | 1.0 | 1.5 | 3.0 | 2.5 | 1.0 | 3.0 | 2.5 | 2.5 |
| 2 | 1 | 1.0 | 1.5 | 2.0 | 3.0 | 1.0 | 1.5 | 1.0 | 2.5 |
| | 2 | 1.0 | 2.0 | 1.5 | 3.0 | 1.0 | 1.5 | 2.0 | 2.0 |
| 3 | 1 | 1.0 | 1.5 | 1.5 | 1.5 | 1.0 | 1.5 | 3.0 | 1.5 |
| | 2 | 1.0 | 1.5 | 1.5 | 2.5 | 1.0 | 4.5 | 3.0 | 3.0 |
| 4 | 1 | 1.0 | 2.5 | 1.0 | 1.5 | 1.0 | 4.5 | 1.0 | 4.0 |
| | 2 | 1.0 | 1.5 | 1.0 | 1.5 | 1.0 | 3.5 | 2.0 | 3.0 |
| 5 | 1 | 1.0 | 1.5 | 1.5 | 1.0 | 1.0 | 1.5 | 1.5 | 1.5 |
| | 2 | 1.0 | 2.0 | 1.0 | 3.0 | 1.0 | 1.5 | 2.5 | 3.0 |
| 6 | 1 | 1.0 | 2.5 | 1.0 | 3.5 | 1.0 | 1.5 | 1.0 | 4.0 |
| | 2 | 1.0 | 2.5 | 1.0 | 2.0 | 1.0 | 1.5 | 2.0 | 3.0 |
| 7 | 1 | 1.0 | 1.5 | 1.0 | 2.0 | 1.0 | 3.0 | 3.5 | 3.5 |
| | 2 | 1.0 | 1.0 | 1.0 | 2.0 | 1.0 | 2.0 | 3.0 | 3.5 |
| 8 | 1 | 1.0 | 1.0 | 1.0 | 2.5 | 1.0 | 2.5 | 2.0 | 2.0 |
| | 2 | 1.0 | 2.0 | 1.5 | 3.0 | 1.0 | 3.0 | 1.0 | 2.0 |
| 9 | 1 | 1.0 | 2.0 | 1.5 | 3.0 | 1.0 | 2.5 | 1.0 | 4.0 |
| | 2 | 1.0 | 1.5 | 1.5 | 2.5 | 1.0 | 2.0 | 2.5 | 3.0 |
| 10 | 1 | 1.0 | 2.5 | 1.5 | 3.5 | 1.0 | 3.0 | 2.0 | 2.0 |
| | 2 | 1.0 | 2.0 | 1.0 | 2.5 | 1.0 | 3.0 | 1.5 | 2.0 |
| 11 | 1 | 1.0 | 2.0 | 1.0 | 3.5 | 1.0 | 2.0 | 1.5 | 2.0 |
| | 2 | 1.0 | 2.0 | 1.0 | 1.5 | 1.0 | 3.0 | 1.0 | 1.5 |

TABLE 5-continued

PI Blue -Cracking Ratings Raw Data

| | | | | | | | | |
|---|---|---|---|---|---|---|---|---|
| 12 | 1 | 1.0 | 1.0 | 1.0 | 1.5 | 1.0 | 3.5 | 1.5 | 4.5 |
| | 2 | 1.0 | 5.0 | 1.0 | 3.5 | 1.0 | 3.0 | 1.5 | 4.5 |
| 13 | 1 | 1.0 | 1.0 | 1.0 | 2.0 | 1.0 | 2.5 | 2.5 | 1.5 |
| | 2 | 1.0 | 1.0 | 1.0 | 1.5 | 1.0 | 3.0 | 1.5 | 1.5 |
| 14 | 1 | 1.6 | 1.5 | 1.0 | 3.0 | 1.0 | 3.0 | 1.0 | 3.0 |
| | 2 | 1.0 | 1.0 | 1.0 | 2.5 | 1.0 | 1.5 | 1.0 | 1.0 |
| 15 | 1 | 1.0 | 1.0 | 1.0 | 1.5 | 1.0 | 1.5 | 1.5 | 3.0 |
| | 2 | 1.0 | 2.5 | 1.0 | 3.5 | 1.0 | 3.5 | 1.5 | 3.5 |
| Average | | 1.00 | 1.77 | 1.23 | 2.45 | 1.00 | 2.50 | 1.82 | 2.73 |

Set B
Ageing condition

| Unaged | | | | Aged 70 C., 7 days | | | |
|---|---|---|---|---|---|---|---|

Glove type

| PI Blue with Michem Lube | | PI Blue w/o Michem Lube | | PI Blue with Michem Lube | | PI Blue w/o Michem Lube | |
|---|---|---|---|---|---|---|---|

Experiment

| MU_320 | MU220 | NU_320 | NU220 | MA_320 | MA220 | NA_320 | NA220 |
|---|---|---|---|---|---|---|---|

Packaging condition

| piece# | point# | 320 mbar | 220 mbar | 320 mbar | 220 mbar | 320 mbar | 220 mbar | 320 mbar | 220 mbar |
|---|---|---|---|---|---|---|---|---|---|
| 1 | 1 | 1.0 | 1.0 | 3.0 | 1.0 | 2.0 | 1.5 | 3.0 | 2.5 |
| | 2 | 1.5 | 1.5 | 3.0 | 1.0 | 2.0 | 1.0 | 2.5 | 2.0 |
| 2 | 1 | 1.0 | 1.0 | 2.5 | 1.0 | 2.5 | 1.0 | 4.0 | 4.5 |
| | 2 | 1.0 | 1.0 | 2.5 | 1.5 | 1.5 | 1.5 | 3.5 | 3.5 |
| 3 | 1 | 1.0 | 1.0 | 3.5 | 2.5 | 1.5 | 1.0 | 2.5 | 3.5 |
| | 2 | 1.0 | 1.0 | 4.0 | 2.5 | 1.0 | 1.0 | 3.5 | 3.0 |
| 4 | 1 | 1.0 | 1.0 | 3.5 | 2.5 | 1.5 | 1.0 | 4.0 | 3.0 |
| | 2 | 1.0 | 1.5 | 3.5 | 2.5 | 3.0 | 1.0 | 4.5 | 3.5 |
| 5 | 1 | 1.0 | 1.0 | 2.0 | 1.5 | 1.0 | 1.5 | 4.0 | 3.0 |
| | 2 | 1.0 | 1.0 | 2.5 | 1.0 | 2.0 | 1.0 | 3.5 | 3.5 |
| 6 | 1 | 1.5 | 1.0 | 2.5 | 2.0 | 1.5 | 1.0 | 3.5 | 2.5 |
| | 2 | 1.0 | 1.0 | 2.0 | 2.0 | 1.0 | 1.5 | 4.0 | 2.5 |
| 7 | 1 | 1.0 | 1.0 | 2.5 | 3.0 | 1.5 | 1.5 | 4.0 | 2.0 |
| | 2 | 1.0 | 1.0 | 2.5 | 2.0 | 1.5 | 1.0 | 4.0 | 3.5 |
| 8 | 1 | 1.0 | 1.0 | 2.5 | 1.5 | 1.0 | 1.0 | 4.0 | 3.5 |
| | 2 | 1.0 | 1.0 | 1.0 | 1.5 | 1.5 | 1.0 | 4.5 | 3.5 |
| 9 | 1 | 1.5 | 1.5 | 1.5 | 2.5 | 1.0 | 1.5 | 3.5 | 2.0 |
| | 2 | 1.5 | 1.0 | 1.5 | 1.5 | 2.0 | 1.0 | 2.5 | 2.0 |
| 10 | 1 | 1.0 | 1.0 | 2.0 | 1.5 | 1.5 | 1.0 | 2.5 | 3.0 |
| | 2 | 1.0 | 1.5 | 2.0 | 2.0 | 3.0 | 1.0 | 3.5 | 2.5 |
| 11 | 1 | — | — | — | — | — | — | — | — |
| | 2 | — | — | — | — | — | — | — | — |
| 12 | 1 | — | — | — | — | — | — | — | — |
| | 2 | — | — | — | — | — | — | — | — |
| 13 | 1 | — | — | — | — | — | — | — | — |
| | 2 | — | — | — | — | — | — | — | — |
| 14 | 1 | — | — | — | — | — | — | — | — |
| | 2 | — | — | — | — | — | — | — | — |
| 15 | 1 | — | — | — | — | — | — | — | — |
| | 2 | — | — | — | — | — | — | — | — |
| Average | | 1.10 | 1.10 | 2.50 | 1.83 | 1.68 | 1.15 | 3.55 | 2.95 |

Notes for Table 5:
1. All packaged gloves were sterilized with gamma irradiation at 29.0 kGy to 43.5 kGy.
2. Identification of Experiments:
   M—gloves had Michem Lube (4 phr)
   N—gloves had No Michem Lube
   U—gloves were Unaged
   A—gloves were Aged
   The numerical value corresponds to the reduced pressure (in mbar) used for packaging the gloves. Hence, MU180=Unaged gloves with Michem Lube packed at 180 mbar, and NA220=Aged gloves with No Michem Lube packed at 220 mbar,
3. All gloves contained 2 phr Wingstay L From these raw data, statistical analyses using the student t-test at a 99% confidence level were carried out to determine whether the mean surface cracking values of two different groups of experiments were (statistically) significantly different. The results of the West analyses are summarized in Table 6. Surface cracking rating for both the unaged gloves and after ageing at 70° C. for 7 days were determined. However, as a predictive test for cracking, it is preferred to age the glove at 70° C. for 7 days.

Notes for Table 6: For gloves that have been aged 7 days at 70° C., the following are statistically significant:
1. At a fixed reduced pressure, gloves with Michem Lube showed less cracking than those without ML:
   1.1. At fixed pressure of 220 mbar, gloves with ML showed less cracking than those without ML (MA220 vs NA220).
   1.2. At fixed pressure of 180 mbar, gloves with ML showed less cracking than those without ML (MA180 vs NA180).
2. Without using ML, gloves packaged under reduced pressure showed less cracking than those packaged under normal pressure:
   2.1, Without using ML, gloves packaged under reduced pressure of 180 mbar showed less cracking than those packaged under normal pressure of 320 mbar (NA180 vs NA320),
   2.2. Without using ML, gloves packaged under reduced pressure of 220 mbar gives less cracking than those packaged under normal pressure of 320 mbar (NA220 vs NA320).
3a. With ML, gloves packaged under reduced pressure showed less cracking than those packaged under normal pressure:

TABLE 6

Summary of two samples t-test analysis on Cracking rating of PI Blue gloves

| # | t0 | t1 | Aged condition | Label | Results at 99% CI |
|---|---|---|---|---|---|
| 1 | with MichemLube-220 mbar | w/o MichemLube-220 mbar | Unaged | MU220 vs NA220 | Significant difference |
| | | | Aged 70° C., 7 days | MA220 vs NA220 | Significant difference |
| 2 | with MichemLube-180 mbar | w/o MichemLube-180 mbar | Unaged | MU180 vs NA180 | Significant difference |
| | | | Aged 70° C., 7 days | MA180 vs NA180 | Significant difference |
| 3 | w/o MichemLube-320 mbar | w/o MichemLube-180 mbar | Unaged | NU320 vs NU180 | Significant difference |
| | | | Aged 70° C., 7 days | NA320 vs NA180 | Significant difference |
| 4 | w/o MichemLube-320 mbar | w/o MichemLube-220 mbar | Unaged | NU_320 vs NU220 | Significant difference |
| | | | Aged 70° C., 7 days | NA_320 vs NA220 | Significant difference |
| 5 | with MichemLube-320 mbar | with MichemLube-180 mbar | Unaged | MU320 vs MU180 | Significant difference |
| | | | Aged 70° C., 7 days | MA320 vs MA180 | Significant difference |
| 6 | with MichemLube-320 mbar | with MichemLube-220 mbar | Unaged | MU_320 vs MU220 | No significant difference |
| | | | Aged 70° C., 7 days | MA_320 vs MA220 | Significant difference |
| 7 | w/o MichemLube-320 mbar | with MichemLube-180 mbar | Unaged | NU320 vs MU180 | Significant difference |
| | | | Aged 70° C., 7 days | NA320 vs MA180 | Significant difference |
| 8 | w/o MichemLube-320 mbar | with MichemLube-220 mbar | Unaged | NU_320 vs MU220 | Significant difference |
| | | | Aged 70° C., 7 days | NA_320 vs MA220 | Significant difference |
| 9 | with MichemLube-220 mbar | with MichemLube-180 mbar | Unaged | MU220 vs MU180 | No significant difference |
| | | | Aged 70° C., 7 days | MA220 vs MA180 | Significant difference |
| 10 | w/o MichemLube-220 mbar | w/o MichemLube-180 mbar | Unaged | NU220 vs NU180 | Significant difference |
| | | | Aged 70° C., 7 days | NA220 vs NA180 | Significant difference |

3a.1. With ML, gloves packaged under reduced pressure of 180 mbar gives less cracking than those packaged normal pressure of 320 mbar (MA180 vs MA320).
3a.2. With ML, gloves packaged under reduced pressure of 220 mbar gives less cracking than those packaged under normal pressure of 320 mbar (MA220 vs MA320),
3b. With ML, gloves packaged under reduced pressure showed less cracking than those without ML but packaged under normal pressure:
3b.1 With ML, gloves packaged under reduced pressure of 180 mbar showed less cracking than those without ML but packaged under normal pressure of 320 mbar (MA180 vs NA320).
3b.2. With ML, gloves packaged under reduced pressure of 220 mbar showed less cracking than those without ML but packaged under normal pressure of 320 mbar (MA220 vs NA320).
4. With ML or without ML, gloves packaged under lower pressure of 180 mbar gives less cracking than those packaged under 220 mbar (MA180 vs MA220 & NA180 vs NA220).

Table 7 shows that removing more oxygen trapped in the glove package and adding an antiozonant (Michem Lube 180) to a glove containing 2 phr antioxidant (Wingstay L.) can reduce degradation cracking.

TABLE 7

Cracking of PI Blue as seen under Light Microscope at 50× magnification

|  | PI Blue with 4 phr Michem Lube 180, Crack rating | Control: PI Blue without Michem Lube 180, Crack rating |
|---|---|---|
| Unaged, Normal vacuum, 320 mbar | 1.1 (1-1.5) | 2.5 (1-4.0) |
| Unaged, High vacuum, 220 mbar | 1.1 (1-1.5) | 1.8 (1-2.5) |
| Aged 70° C./7 days, Normal vacuum, 320 mbar | 1.7 (1-3.0) | 3.6 (2.5-4.5) |
| Aged 70° C./7 days, High vacuum, 220 mbar | 1.2 (1-1.5) | 3.0 (1.5-3.5) |

Notes for Table 7 crack ratings:
(i) PI Blue refers to a PI glove that is blue in color.
(ii) To see the cracking better, the glove was lightly stretched with fingers to expose the cracks. Due to the elastic properties of rubber, small and shallow cracks tend to close up and are not visible but when lightly stretched these become visible.
(iii) For gloves that have no added color pigment, the area to be examined may be stained blue with a marker pen, if necessary. This gives a better contrast making a small crack more visible under the light microscope.
(iv) Rating of Cracks: 1—No cracking
 2—Slight cracking
 3—Moderate cracking
 4—Fairly severe cracking
 5—Severe cracking resulting in a pinhole which is visible when the opposite side is examined. These ratings could further be extended to 0.5 unit intervals, e.g., 1.5, 2.5, 3.5, 4.5.
(v) For each condition, the internal or donning surface of 10 pieces of gloves was examined. For each glove, the 2 corners of the folded glove were examined and rated for cracking.
The crack rating value shown is the average of 20 values, which is taken as representative of crack rating of the lot of gloves.
(vi) Values given in brackets are the range of the crack rating.
(vii) As a predictive test for cracking, it is preferred to age the glove at 70° C. for 7 days before examining it under the light microscope.

Example 3

Effect of Vacuum Level on Degradation Cracking

Table 8 shows that using a higher vacuum of 180 mbar for packaging gives even better results. The gloves used in Example 3 have the same elastomer composition as the gloves of Example 2.

TABLE 8

Cracking of PI Blue glove as seen under Light Microscope at 50× magnification Cracking Ratings

|  | Glove with 4 phr Michem Lube 180 | | Control glove without Michem Lube 180 | |
|---|---|---|---|---|
|  | HV, 180 mbar | NV, 320 mbar | HV, 180 mbar | NV, 320 mbar |
| Unaged | 1.0 (1.0-1.0) | 1.8 (1.0-5.0) | 1.2 (1.0-3.0) | 2.5 (1.0-3.5) |
| Aged, 7 days/70° C. | 1.0 (1.0-1.0) | 2.5 (1.5-4.5) | 1.8 (1.0-3.5) | 2.7 (1.0-4.5) |
| Aged, 14 days/70° C. | 1.1 (1.0-1.5) | 2.3 (1.5-5.0) | 1.9 (1.0-2.5) | 3.2 (1.5-4.0) |

Example 4

Barrier Integrity of Gloves

The barrier integrity of PI Blue gloves with 4 phr Michem Lube 180 packed under normal vacuum of 320 mbar and a high vacuum of 180 mbar were tested by testing for holes in the gloves according to ASTM D5151-06 Standard Test Method for Detection of Holes in Medical Gloves.

Both unaged gloves and gloves that have undergone accelerated ageing at 7 days/70° C. were tested and the results are given in Table 9. These gloves are from the same lot as those of Example 3,

TABLE 9

Holes in PI Blue glove with 4 phr Michem Lube 180, packaged under different vacuum levels

|  | Unaged | | | Aged 7 days at 70° C. | | |
|---|---|---|---|---|---|---|
| Vacuum, mbar | No. gloves tested | No. gloves with holes | % Holes | No. gloves tested | No. gloves with holes | % Holes |
| 180 | 402 | 1 | 0.2 | 400 | 0 | 0 |
| 320 | 200 | 3 | 1.5 | 200 | 11 | 5.5 |

The result shows that gloves packed under high vacuum of 180 mbar had 0.2% holes for unaged gloves and 0% for aged gloves compared with 1.5% holes for unaged gloves and 5.5% for aged gloves packed under normal vacuum of 320 mbar.

It is necessary for aged gloves to have a hole level of less than 1.5% to meet regulatory requirements for surgical gloves.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of considerable modification, alteration, and equivalents in form and function, as will occur to those ordinarily skilled in the pertinent arts having the benefit of this disclosure.

While the present invention has been described for what are presently considered the preferred embodiments, the invention is not so limited. To the contrary, the invention is intended to cover various modifications and equivalent arrangements included within the spirit and scope of the detailed description provided above.

What is claimed:

1. A method of packaging an elastomeric article, the method comprising:
    providing an elastomeric article comprising synthetic polyisoprene and an antiozonant;
    placing the elastomeric article in a package;
    exposing the package to a vacuum to form a reduced-oxygen environment inside the package, wherein the reduced-oxygen environment contains less than about 20 $cm^3$ of trapped oxygen;
    sealing the package to provide the elastomeric article within the reduced-oxygen environment inside the package; and
    sterilizing the elastomeric article provided within the reduced-oxygen environment inside the package using a sterilization process comprising radiation sterilization,
    wherein the elastomeric article exhibits reduced degradation compared to a comparison elastomeric article that does not comprise an antiozonant but is provided within a similar reduced-oxygen environment or a comparison elastomeric article that comprises an antiozonant but is provided within a higher-oxygen environment.

2. The method of claim 1, wherein the package has a volume of about 335 $cm^3$ or less.

3. The method of claim 1, wherein the package has a volume of about 280 $cm^3$ or less.

4. The method of claim 1, wherein the package has a volume of about 225 $cm^3$ or less.

5. The method of claim 1, wherein the reduced-oxygen environment contains less than about 16 $cm^3$ of trapped oxygen.

6. The method of claim 1, wherein the reduced-oxygen environment contains less than about 14 $cm^3$ of trapped oxygen.

7. The method of claim 1, wherein the antiozonant comprises an anionic wax emulsion.

8. The method of claim 1, wherein the elastomeric article further comprises an antioxidant.

9. The method of claim 8, wherein the antioxidant comprises a butylated reaction product of p-cresol and dicyclopentadiene.

10. The method of claim 1, wherein the sterilization process is selected from the group consisting of gamma irradiation, x-ray irradiation, and electron beam processing.

11. The method of claim 1, wherein the vacuum has a pressure of less than 320 mbar.

12. The method of claim 1, wherein the vacuum has a pressure of 250 mbar or less.

13. The method of claim 1, wherein the vacuum has a pressure of 220 mbar or less.

14. The method of claim 1, wherein the vacuum has a pressure of 180 mbar or less.

15. The method of claim 1, wherein the vacuum has a pressure of between 180 and 220 mbar.

16. The method of claim 1, wherein the package comprises a low-oxygen-permeable material.

17. The method of claim 1, wherein the degradation is selected from holes in the elastomeric article, surface cracking, surface discoloration, and combinations thereof.

18. The method of claim 1, wherein the elastomeric article has a thickness of 0.22 mm or less.

* * * * *